United States Patent [19]
Feinberg et al.

[11] 4,243,845
[45] Jan. 6, 1981

[54] REPERTORY TELEPHONE DIALING APPARATUS

[75] Inventors: Martin H. Feinberg, Montvale; John DeFilippis, South Amboy; Ting W. Wong, Ocean Port, all of N.J.

[73] Assignee: International Telephone and Telegraph Corporation, New York, N.Y.

[21] Appl. No.: 5,540

[22] Filed: Jan. 22, 1979

[51] Int. Cl.³ .......................................... H04M 1/274
[52] U.S. Cl. ............................ 179/90 B; 179/90 BD
[58] Field of Search ........... 179/90 B, 90 BD, 90 BB, 179/90 K, 90 AD

[56] References Cited

U.S. PATENT DOCUMENTS

| | | | |
|---|---|---|---|
| 3,670,111 | 6/1972 | Bukosky et al. | 179/90 BD |
| 3,932,709 | 1/1976 | Hoff et al. | 179/90 B |
| 4,008,380 | 2/1977 | La Borde | 179/90 K |
| 4,011,414 | 3/1977 | Warren | 179/90 B |
| 4,053,718 | 10/1977 | Derveaux | 179/90 B |
| 4,119,810 | 10/1978 | Marin et al. | 179/90 B |

*Primary Examiner*—Gerald L. Brigance
*Attorney, Agent, or Firm*—John T. O'Halloran

[57] ABSTRACT

A repertory dialer provides instant recall of any one of a plurality of telephone numbers which are stored in a memory associated with the dialer. Each stored number is available at the touch of a recall button and an appropriate key button. The numbers as stored are automatically converted into Touch Tone signals for transmission via a conventional telephone line. The dialer can operate in a storage mode to enable a user to program a desired number to be stored in association with a particular key. The storage mode is accessed by means of a separate storage key. The apparatus further includes a last number storage mode wherein the last telephone number dialed by the apparatus can be recalled and retransmitted via a double depression of the recall key.

9 Claims, 2 Drawing Figures

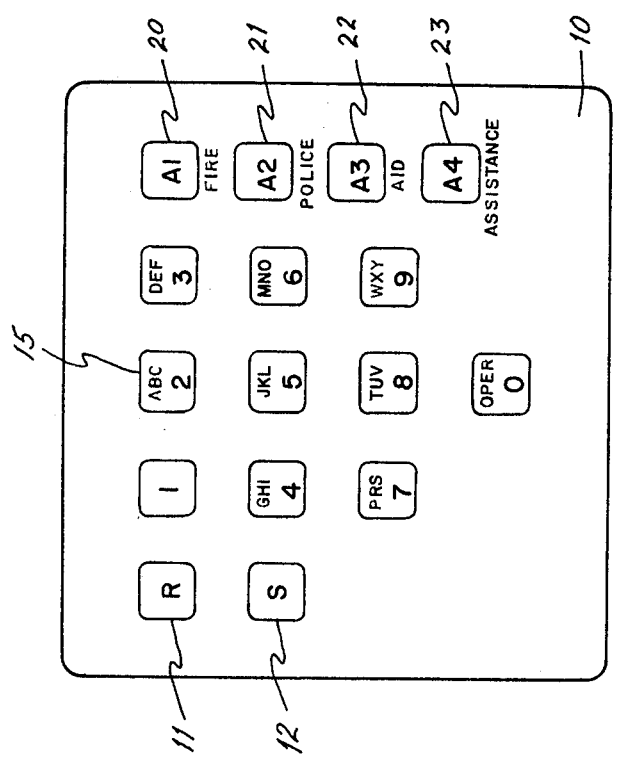

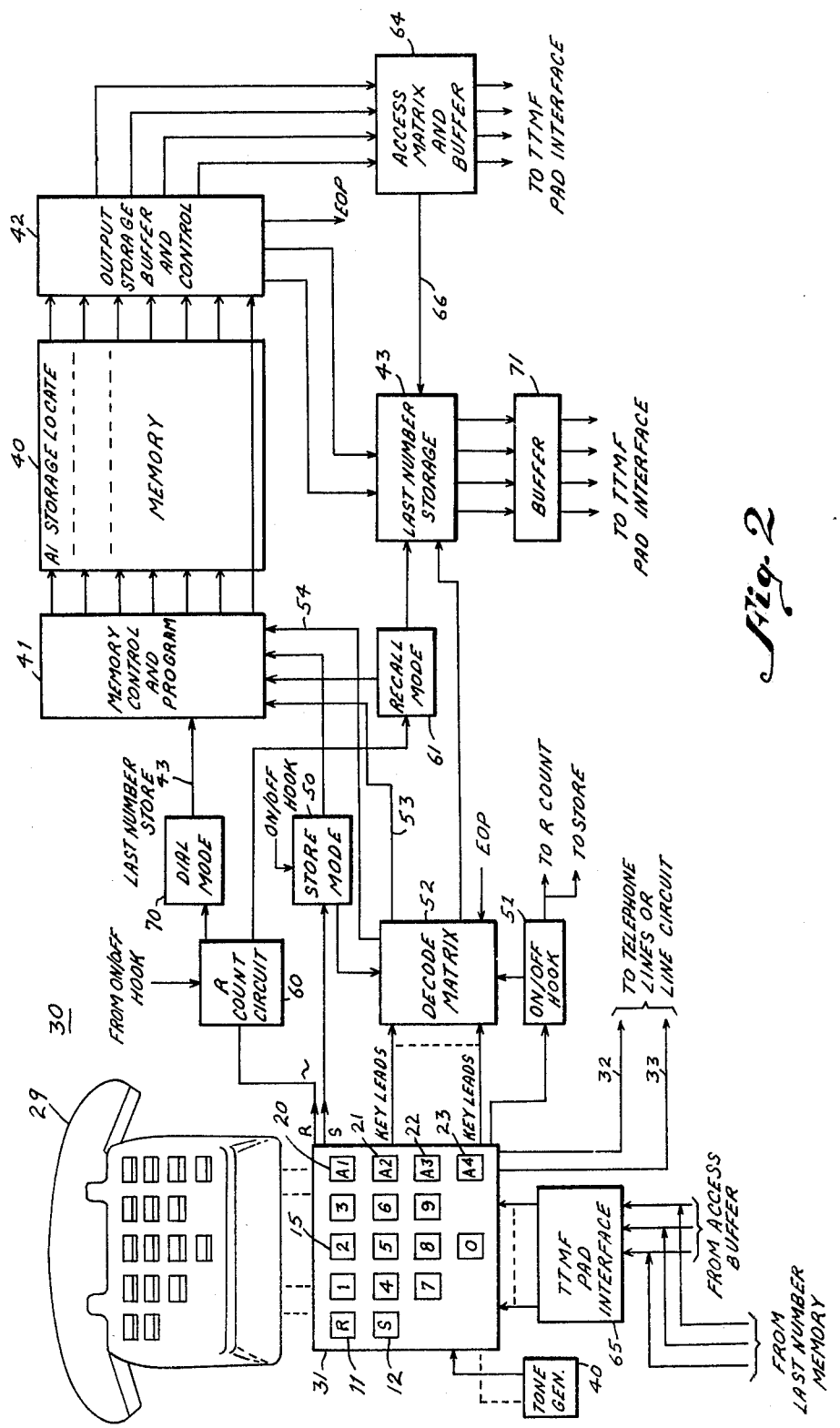

REPERTORY TELEPHONE DIALING APPARATUS

BACKGROUND OF THE INVENTION

This invention relates to a telephone dialer and more particularly to a repertory dialer to be used in conjunction with a telephone for instant recall and automatic dialing of a plurality of stored telephone numbers.

Significant technical strides have been made in the field of telephony. In particular, modern day telephone systems are capable of making rapid connections between a called and a calling party and include sophisticated electronic components to accomplish improved communications capabilities.

The basic telephone subset has also undergone changes in regard to dialing techniques. Presently, a great many modern telephones employ touch tone dialing. Touch Tone dialing uses a multifrequency code to generate dialing signals so that a telephone number can be transmitted by a tone or frequency pattern. This frequency pattern is decoded by the telephone system to determine the dialed number. Such telephones conventionally employ a keyboard which consists of a plurality of keys, each one indicative of one digit as 0 to 9. The keys when operated provide the tone pattern indicative of the dialed number. Touch tone dialing is used in lieu of the dial pulse techniques employed in prior art telephones.

It is apparent that there is a need in conjunction with such telephones to provide apparatus which enables the automatic and rapid dialing of a predetermined telehpone number without requiring the user to dial the various digits of a number in a conventional manner. Such automatic telephone dialers presently exist on the market and operaate to store numbers on data cards such as punch cards, magnetic cards and so on. In these systems, a party of location is selected by the user and upon the implementation of an appropriate command, the telephone apparatus automatically dials the number according to the data stored.

It is an object of the present invention to provide an automatic dialing apparatus which is integrally associated with a telephone and which is simple to operate and extremely reliable and economical to implement.

BRIEF DESCRIPTION OF THE PREFERRED EMBODIMENT

A repertory dialing system for a telephone subset comprising a keyboard array having a first set of 0 to 9 digit keys, a second set of digit keys, and a R key and an S key, memory means having a plurality of accessible storage locations, each one capable of having stored therein a plurality of digits indicative of a telephone number, first control means coupled to said memory means and responsive to the operation of said S key and at least one of said first or second keys to cause said memory to store at a predetermined selected location, a telephone number as dialed by said digit keys indicative of said selected key and during the operation of said S key, second control means coupled to said memory and responsive to a single operation of said R key and said selected key to cause said memory to retrieve said number stored at said selected location, and signal generating means responsive to said number as retrieved to generate a signal capable of transmission via telephone lines and indicative of said telephone number.

BRIEF DESCRIPTION OF THE FIGURES

FIG. 1 is a pictorial view of a telephone dialer keyboard having a format according to this invention.

FIG. 2 is a block diagram of a repertory dialing apparatus according to this invention.

DETAILED DESCRIPTION OF THE INVENTION

Before proceeding with a detailed explanation of the operation of the system and the description of the apparatus to be used, a brief indication of the utility of the system will be described.

There is a need to provide rapid access to a plurality of called locations in the event of emergencies to notify the police department, fire department, a physician and so on. In times of stress, it has been determined that many persons may experience great problems in using a telephone in order to gain access to an emergency location. Thus, as one can see, in times of such difficulty, it would be extremely desirable to enable one to dial using as few keys as possible in order to gain access to a location during an emergency situation. It is also apparent that such a feature would be very useful to a telephone user in order to initiate calls to a frequently used number, such as that of a friend, relative, or business associate.

As briefly indicated above, a main objective of such a system is to enable and initiate automatic dialing on a simple and reliable basis. It is also desirable that the user can program or store such numbers simply and economically so that a typical user can program and employ the unit with a minimum of difficulty.

Referring to FIG. 1, there is shown a typical keyboard 10 which may be employed with a repertory dialer according to this invention. As is seen from FIG. 1, the keyboard contains the conventional pushbutton keys indicative of the digits 0 to 9 found in a conventional touch tone dialing system. The format of these keys are arranged in a conventional format as appears in most present day telephone sets.

In conjunction with the ten conventional keys (designated in FIG. 1 as 0 to 9) are two additional keys 11 and 12 designated as R and S keys. As will be explained, the keyboard and the telephone set associated therewith enables a plurality of operational modes. Each mode will be briefly described in order to familiarize one with the requirements of the apparatus.

1. NORMAL DIALING:

This is a conventional dialing mode which enables a user to employ the conventional keyboard (keys 0 to 9) to dial in telephone numbers as would be accomplished in an ordinary telephone. This operation is referred to as normal or manual dialing and is accomplished in exactly the same manner as in present telephony apparatus.

2. RECALL OF LAST NUMBER DIALED MANUALLY:

The telephone set employing the apparatus of this invention enables a user to access the last number which was dialed and to initiate a call to this number without a manual re-dialing. To accomplish this, the user initiates the following procedure: The user lifts the hand set from the telephone and waits for a dial tone. When the dial tone is received, the user then depresses and releases the recall key (R) 11 twice. The last telephone number dialed is stored by the apparatus and will be transmitted automatically upon a double activiation of the R key 11. The advantage of this operation should be apparent as it enables one to initiate rapid dialing. Hence, one can continuously dial a busy line without the constant repetition necessitated by the conventional manual operation of the keyboard. It further enables one to check or determine the number which was last employed or accessed via the telephone set, if desired.

3. STORAGE OF A NUMBER:

In order to program the system, one must have the capability of simply and accurately inserting a number into the apparatus indicative of a predetermined location which one desires to access. This may be the telephone number of the family doctor, a business associate, or a relative. In order to accomplish storage, the following procedure is employed: The hand set associated with the telephone remains on hook. The user then depresses the S button or STORE key 12 and maintains the same in the depressed condition. The user then depresses one of the keys reserved to such numbers which may be keys 1 to 6 associated with the conventional keyboard. It is, of course, understood that the conventional keyboard has ten keys which are designated as 0 to 9 and hence, one has the capability of storing ten telephone numbers. It is also understood that additional keys such as 20 and 21 can also be employed to access a memory location and to store at that location, additional telephone numbers. After depression of a selected key which may be, for example, Key 2 (also referred to in FIG. 1 as 15), the user then dials the number to be stored in memory and indicative of the called party to be accessed via key 2. The user then releases the S key 12. In this manner, the number dialed by the user during depression of the S key is now available for automatic dialing, when the unit is operated in the RECALL MODE next described.

4. RECALL OF A NUMBER:

As indicated above, a predetermined telephone number was inserted into a memory location associated with the key 15. During the RECALL MODE, the user will now initiate a call to the party whose number was inserted in memory and associated with key 15. To dial this number, the user lifts the hand set and waits for dial tone. When dial tone is received, the user then depresses and releases the R key 11. The user then depresses and releases the key 15 associated with the digit 2. The number which was stored is automatically transmitted by the apparatus via the telephone lines without further dialing on the part of the user. Hence, as can be seen, the user has now successfully dialed a number by the depression of two keys; the recall key (R) 11 and the digit key 15 associated with that number. It is, of course, understood that the storage procedure enables the storage of the telephone number and the area code associated therewith. This normally consists of ten digits and hence, the user can access a ten digit number by merely depressing two keys.

5. EMERGENCY NUMBERS DIALED:

Basically, any of the conventional keys 0 to 9 can be employed to access any telephone number desired. In order to provide a universal format, certain keys such as keys 7,8,9, and 0 can be reserved for storing emergency telephone numbers. The procedure for storing emergency numbers is exactly the same as described in Section 3. The user may be instructed to reserve keys 7,8,9 and 0 as follows: Key 7 is the location at which the police department number is stored. Key 8 is the location of the fire department. Key 9 would be the location of an aid facility such as a rescue squad, first aid office, hospital emergency room and so on. Key 0, or the operator key, would be the number of a person who would have knowledge of the user of the telephone and could offer aid in times of emergency or provide general information in regard to the party. In this manner, any person could use this phone to access the police, fire or emergency numbers without otherwise knowing the number of the emergency facility. This can be done completely without the assistance of an operator or a directory. Therefore, in the case of an emergency where one may be disabled or injured, any person gaining access to the premises merely has to depress the recall key 11 and then one of the keys 7,8,9, or 0. This procedure enables one to contact the emergency number without further ado. The system provides an extreme advantage in emergency conditions to enable the rapid dialing by anyone having access to the telephone set according to this invention.

The apparatus employing a keyboard as shown in FIG. 1 enables one to store ten or more unique telephone numbers; each of which is accessible by the depression of the recall key 11 and one additional key as a digit key. One can thus accomplish rapid dialing as desired by employing the described apparatus, while further enabling one to use the telephone for conventional dialing.

It is, of course, understood that the ten keys associated with a conventional telephone can be employed as above described to access ten predetermined locations. It is apparent that additional keys such as 20 and 21 shown in FIG. 1 can also be employed to increase the storage capability of such a system. Hence, one can provide additional location keys as 20 and 21 located on the touch tone panel to enable one to access additional numbers.

If reference is now made to FIG. 2, a circuit schematic partially in block form is shown which includes apparatus which operates according to the above described procedures.

There is shown a typical telephone subset 30. The subset 30 has a key arrangement as that shown in FIG. 1 and hence is of the type capable of providing "Tel Touch" dialing. The keyboard is shown in greater detail as 31 and located beneath the subset or telephone 30.

As is well known, keyboards as 31 for providing multifrequency or Touch Tone dialing are well known in the art and operate to provide coded tone signals on output leads as 32 and 33 indicative of the key depressed. In this manner, the depression of a particular key enables a unique code to be generated; which code indicates the digit dialed as, for example, a "two" for the depression of key 15.

Also shown on the keyboard 31 is the R switch 11, the S switch 12 and the alternate keys or emergency keys 20, 21, 22 and 23.

Many examples of keyboards as 31 are known in the art and operate to generate tones as signals according to the depression of suitable keys, as above described. As will be apparent, any type of keyboard can be employed with this invention and therefore the operation and description is based upon generic considerations as any modifications necessary due to the use of an alternate keyboard 31 and dial frequency generating means will become apparent to those skilled in the art.

The repertory dialing apparatus is associated with a memory 40. Memory 40 is of a standard type presently available in integrated circuit form and available from many manufacturers. As is well known, the function of the memory 40 is to store information at specified addresses and to retrieve the stored information upon implementation of proper commands and controls. As such, the memory may be addressed and accessed via a memory control and processor module 41. Techniques for programming and control of a memory 40 are well known and most manufacturers supply the memory 40 with the control functions as implemented in module 41 as an integral unit. The memory 40 is associated with an output storage buffer and control module 42. The function of module 42 is to store the data accessed by the memory 40 upon proper commands from memory control 41. The data thus accessed and stored in buffer 42 can be used for subsequent processing, as will be explained.

Also shown is a last number storage module 43. Module 43 is also a memory and operates to store the last number dialed as above described. For the sake of clarity, the module 43 is shown as a separate module, but as will be understood, the storage facility for the last number dialed could be implemented within the main memory module 40.

As will be explained, the memory 40 and the associated input and output controls as 41 and 42 are programmed and operated under control of the keyboard 31 and associated control logic, which as explained above, enables implementation of the operating modes.

In order to understand the block diagram, a description of the function of FIG. 2 will be given in terms of the operating procedure. To more clearly understand the operation of the circuitry, a description of the STORAGE MODE of operation as briefly described in paragraph 3 above will be given.

As described above, in order to program the system, the hand set 29 associated with the subset 30 remains on hook. Essentially, a telephone subset as 30 has a hook switch associated therewith and when the hand set is lifted, the hook switch closes. When the hand set 29 is in the position shown, the hook switch is opened. The user then depresses the S key 12 and the key is held in the depressed position.

Coupled to the keyboard 31 is a store mode circuit 50. The store mode circuit has one input coupled to the store switch 15 and one input obtained from an ON/OFF hook detector 51. Detector 51 monitors the status of the hook switch associated with the subset 30. As such, the detector 51 may be an ordinary gate circuit operative to convert the opened or closed hook switch operation to a logic 0 or logic 1, or to a level suitable for operation with integrated circuit logic modules.

The output of the store mode circuit 50 is coupled to the input of the memory control module 41. This then indicates to memory control that a storage mode is being implemented.

The user then depresses a key of keyboard 31. The key so depressed will control the memory to move to an address at which a telephone number is to be stored.

Referring to FIG. 2, there is shown a decode matrix 52. Decode matrix 52 receives as inputs, a lead indicative of each key on keyboard 31.

Assume in this example, that the user wishes to store the number of the fire department in the memory and desires to store this number in the location of memory reserved for key 20 or the $A_1$ key. Upon depression of key 20, the decode matrix provides a binary number on the output cable 53; which cable is coupled to the memory control module 41.

It is understood that cable 53 is shown as a single line on FIG. 2, but in actual practice may consist of a plurality of parallel lines capable of accessing memory control 41 with a plurality of bits indicative of the key selected.

The memory control module 41 has now received information indicating a storage mode via circuit 50 and information indicating a key address via the matrix 52. Hence, memory control accesses the memory address or storage location reserved for key $A_1$.

The memory storage buffer provides an EOP signal indicating that the address has been accessed and this signal is sent to the decode matrix 52 to enable the same.

The user now dials the number to be stored at the $A_1$ storage location. This number is again converted by the matrix 52 into digital form and is transferred to memory control 41 via cable 54. Each digit of the dialed number is stored in memory at location $A_1$ until the entire number has been dialed. The user then releases the S key 12. Upon release of the S key, the store mode circuit 50 is inactivated, thus releasing memory control from the storage mode. The memory 40 now has stored therein at the address associated with key $A_1$, the telephone number of the fire department.

It is understood that the above described operation is available and will be implemented for any key depressed and hence, for any other key as 1,2, ... $A_2$, $A_3$, $A_4$. The memory 40 will store a number at a different location as accessed by memory control 41 under control of the decode matrix 52 and storage mode circuit 50.

As indicated above, a predetermined telephone number was inserted into memory 40 at the location reserved for key 20 ($A_1$).

RECALL OF A NUMBER

As indicated above, a predetermined telephone number was inserted into the memory 40 and stored at a location reserved for key 20 or $A_1$ key. During the recall mode, the user now lifts the hand set 29 and waits for dial tone. The lifting of the hand set 29 closes the hook switch of the telephone and therefore the hook detector 51 is placed in the off hook mode.

When dial tone is received, the user then depresses the R key 11. As seen in FIG. 2, the R key has an input coupled to an R count circuit 60. The R count circuit may be a binary counter or a logic circuit capable of indicating the number of depressions of the R switch during a mode.

To initiate the recall mode, the R switch is pressed once and released. The R count circuit 60 responds to the single depression and activates a recall mode circuit 61. The recall mode circuit, as will be explained, has its output coupled to the last number storage module 43. An output from the recall mode circuit 61 is also applied to the memory control module 40 to indicate that a recall mode is being implemented.

The user now depresses the key 20 or the $A_1$ key. This information is again decoded by matrix 52 and the memory control 41 during the recall mode, will cause the memory 40 to access the address associated with key 20.

During the recall mode, the memory 40 places the information stored at the location $A_1$ in the output storage and buffer control 42. The information thus retrieved by the memory is indicative of the digital data stored and representative of the telephone number placed in that memory location.

The output storage buffer 42 is coupled to an access matrix and buffer module 64. The buffer module 64 functions to decode the digital data at the output of the storage buffer and applies that data to an interface circuit 65. The interface circuit 65 is designated as a TTMF pad interface and operates the tone generator 90 to transmit tone signals in a serial fashion.

The number to be transmitted to the telephone lines via leads 32 and 33 is a multifrequency tone signal. The access matrix 64 in conjunction with the interface circuit 65 converts the digital information as stored in memory to analog information. The pad interface 65 serves to electronically operate the dial frequency generator associated with the keyboard 31 to cause the mutifrequency dial pulses to be transmitted. The function of the interface 65 is to electronically operate the dialing generator as it can be operated by the key dialing switches.

This the number as stored in the memory in digital form is transmitted via lines 32 and 33 as a multifrequency tone. The last number storage module 43 receives the digital number via cable 66 and hence, has stored therein the telephone number as accessed by the memory during the recall mode.

The above described operations, of course, occur extremely rapidly and when the user releases the digital key 20, the equipment is already transmitting the stored number via the telephone lines. As soon as the stored number is accessed by means of the switching system associated with a telephone central office or PBX, a connection is made between the subset 30 and the called party, which in this case would be the fire department.

Upon hangup of the hand set 29, the on/off hook detector 51 releases the recall mode as described above and modules 60 and 61 are reset to await further operation.

RECALL OF LAST NUMBER:

As above indicated, the last number dialed, which in the above described case occurred during a recall condition, was stored in storage 43. To recall this number, the user does not have to enter a recall mode. To accomplish this, the user initiates the following procedure:

The user again lifts the hand set 29 from the telephone 30 and waits for a dial tone. When the dial tone is received, the user then depresses and releases the recall key 11 twice. Accordingly, the R count circuit 60 recognizes the double count and operates a dial mode circuit 70. The dial mode circuit 70 may be an ordinary gate or flip/flop and has an output coupled to the memory control 41 to indicate to memory control that a recall of a last number is desired.

During this mode, memory control is directed to a memory location which is indicative of the last number stored. As above indicated, the last number storage module is shown separately as module 43, but it could be part of the memory 40.

Upon activation of the dial mode module 70, module 43 transfers the stored number via the output buffer 71 to the pad interface module 65. Accordingly, the pad interface circuit 65 causes the last number as stored in module 43 to be transmitted via the telephone lines. Hence, the user by a double depression of the R key 11, can attempt to access the last number stored as many times as desired.

It is, of course, understood that this mode of operation has particular utility in the case of normal dialing.

NORMAL DIALING

As indicated above, this is a conventional dialing mode where the user employs the conventional part of keyboard 31 without accessing or depressing the R and S keys. When this occurs, both the R count circuit 60 and the store mode circuit 50 are disabled.

The decode matrix 52 is coupled to the key leads associated with the keys as 1,2,3 . . . 0 of the keyboard 31. In this manner, a number dialed during a manual operation is transferred directly from memory control via the output storage register 42 to the last number storage module 43. Hence, module 43 stores each digit of the dialed number in digital form as decoded by the matrix 52 and under control of the memory modules. Therefore, at the end of dialing, each digit that was dialed by the user is again stored in the last number storage module 43. If the call cannot be completed, the user then merely has to press the recall button R twice.

As above described, this will place the apparatus in the recall mode by activating module 61 to cause the last number storage to transfer its contents to the pad interface 65 and thus that number continues to be transmitted by the double depression of the recall key. This therefore saves the user the time which he would expend in continuing to dial and redial the number.

In regard to the above described operation, it is understood that many alternate embodiments can be employed to accomplish the procedures described. It should be apparent to those skilled in the art that the system depicted enables one to access emergency numbers as stored in memory by a simple and rapid operation of a single depression of a recall key and an emergency key, such as 20 to 23.

It is also understood that the normal telephone digit keys as for example, key 15 can also be employed in conjunction with the apparatus described above to store telephone numbers for rapid dialing.

It is noted that the above described logic is under control of suitable clock waveforms which are not shown. The generation of such waveforms to operate digital logic in sequence is well known.

It is also obvious that the dialing pulses as transmitted via lines 32 and 33 are serial and as briefly indicated above, the function of the pad interface 65 is to convert the parallel data indicative of a telephone number into a serial dial pulse frequency signal. Techniques for converting parallel data to serial data is well known in the art.

Since it is obvious that many changes and modifications can be made in regard to the above described structure and apparatus without departing from the nature and spirit of the invention, it is understood that the invention shall not be limited except as specified in the appended claims.

What is claimed is:

1. A repertory dialing system for a telephone subset comprising:
   a keyboard array having a first set of 0 to 9 digit keys, a second set of digit keys, and an R key and an S key,
   memory means having a plurality of accessible storage locations, each one capable of having stored therein a plurality of digits indicative of a telephone number,
   first control means coupled to said memory means and responsive to the operation of said S key and the selection of either at least one of said first digit keys or one of said second digit keys to cause said memory to store, at a selected location indicative of said selected digit key or keys, a telephone number subsequently dialed by said first digit keys,
   second control means coupled to said memory and responsive to a single operation of said R key and the selection of either at least one of said first digit keys or one of said second digit keys to cause said memory to retrieve a stored telephone number from a location indicative of said selected digit key or keys, signal generating means responsive to said number as retrieved to generate a signal capable of transmission via a telephone line and indicative of said telephone number, additional memory means operative to store therein a telephone number dialed solely by the operation of said first digit keys, logic means coupled to said additional memory means and responsive to the multiple operation of said R key to cause said additional memory means to retrieve said telephone number as stored, and means for coupling said logic means to said signal generating means to generate another signal indicative of said dialed telephone number as stored in said additional memory means whereby the last number dialed by said first digit keys is always stored in said additional memory means.

2. The repertory dialing system according to claim 1 wherein said signal generating means generates a signal consisting of predetermined frequency codes, each one indicative of one of said digits 0 to 9.

3. The repertory dialing system according to claim 1 wherein said second set of digit keys manifests emergency conditions to enable storage of a telephone number in said memory means indicative of an emergency condition, wherein each of said keys in said second set is associated with the same type of stored telephone number pertinent to an emergency condition, with at least one key for storing the number of the police, and another key for storing the number of the fire department to enable a user to rapidly place an emergency call.

4. The repertory dialing system according to claim 1 wherein said logic means responsive to the multiple operation of said R key provides an output signal when said R key is operated twice, and means responsive to said output signal to cause said additional memory means to retrieve said telephone number as stored.

5. The repertory dialing system according to claim 1 wherein said memory means has a plurality of accessible storage locations at least equal in number to the number of said first set of digit keys.

6. The repertory dialing system according to claim 1 wherein said memory means has a plurality of accessible storage locations at least equal in number to the number of said second set of digit keys.

7. The repertory dialing system according to claim 1 further including detection means coupled to said subset and operative to provide a first control signal when said subset is on hook and a second control signal when said subset is off hook.

8. The repertory dialing system according to claim 7 further including means coupled to said first control means for enabling the same during the presence of said first signal.

9. The repertory dialing system according to claim 7 further including means coupled to said second control means for enabling the same during the presence of said second signal.

* * * * *